UNITED STATES PATENT OFFICE.

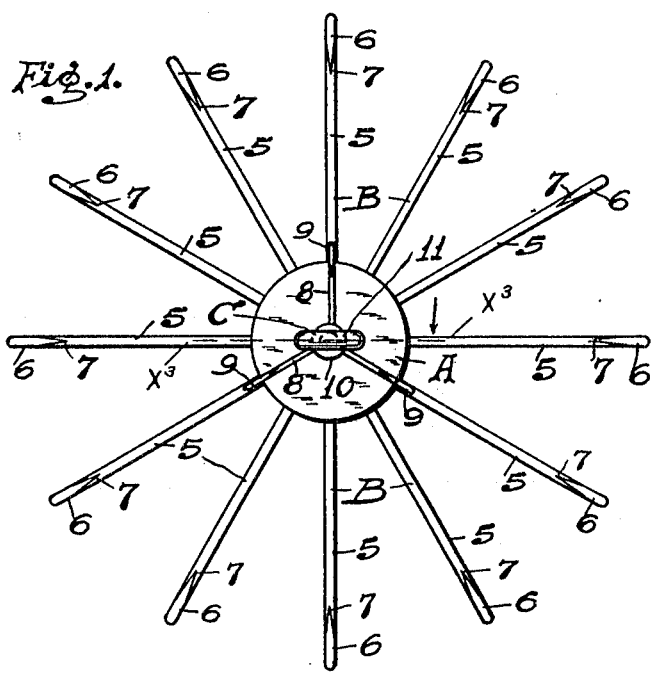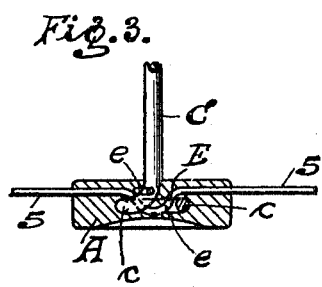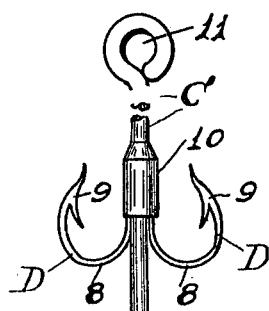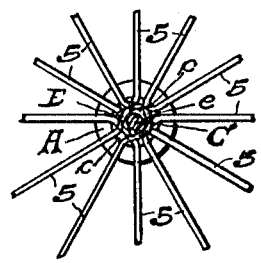

EMILE VACHÉ PARKER, OF LOS ANGELES, CALIFORNIA, ASSIGNOR, BY DIRECT AND MESNE ASSIGNMENTS, OF ONE-FOURTH TO WILLIAM FRANCIS SEEMANN AND ONE-FOURTH TO PETER S. BAYER, BOTH OF LOS ANGELES, CALIFORNIA.

CRUSTACEA HOOK AND TRAP.

1,118,439. Specification of Letters Patent. Patented Nov. 24, 1914.

Application filed April 15, 1913. Serial No. 761,325.

*To all whom it may concern:*

Be it known that I, EMILE VACHÉ PARKER, a citizen of the United States, residing at Los Angeles, in the county of Los Angeles and State of California, have invented new and useful Improvements in Crustacea Hooks and Traps, of which the following is a specification.

This invention relates to crustacea hooks or traps, of that character adapted for aquatic use and more especially to that class and description used for catching lobsters.

The primary object of the invention is the provision of an improved hook for capturing crustacea of the various different kinds, that is adaptable for oceanic service, and may be used from piers, breakwaters or boats.

Another object of the invention is the provision of an improved hook that is provided with novel baiting means, so arranged that the person holding the cord with which the hook is lowered into the water, is instantly cognizant of the presence of a crustacean in the vicinity of the bait; that is in reaching for the bait the crustacean comes in contact with some part of the hook and such contact is felt by the person holding the line.

A further object of the invention is to provide an improved device of the character stated that has its hooks so arranged that when the bait is partaken of, a slight jerk of the cord will securely hook the crustacean.

A still further object of the invention is the provision of novel interconnecting means, the structure and arrangement of which greatly strengthens the hooks, so that the latter are not easily bent.

A still further object of the invention is the provision of a crustacea hook that is superior in point of relative simplicity of construction, positiveness in operation and serviceability.

With the above general and other objects in view the invention further consists in the new and novel provision, formation, construction, organization, combination and relative arrangement of parts, members and features, all as hereinafter described, shown in the drawings and finally pointed out in the claims.

The accompanying drawings are illustrative of the invention, in which:—

Figure 1 is a top plan view of a crustacea hook ready for use; Fig. 2 is an exterior side elevation of the parts shown in Fig. 1; Fig. 3 is a fragmentary cross-sectional view, taken on the line $X^3$—$X^3$ of Fig. 1 looking in the direction of the appended arrows and showing certain interconnecting parts in detail; and Fig. 4 is a fragmentary detail view, taken on the line $X^4$—$X^4$ of Fig. 2 and looking in the direction of the appended arrows.

Like characters of reference designate like parts throughout the several views of the drawings.

Referring with particularity to the drawings, A denotes the base, having embedded therein the hooking means B. The staff C which is also embedded in the base A extends upwardly from said base and has thereon the bait means D. The interconnecting means E comprises the looped end $c$ of said staff C, into which is fitted the loops or bends $e$ of the hooking means B.

The hooking means B specifically comprises a series of tempered wires 5, having the loops or bends $e$ located centrally of the inwardly inclined hooks 6 provided at the ends of said wires 5; said loops or bends $e$ being adapted to fit within the loop $c$ formed at the end of the staff C and at right angles to the latter. Each of the wires 5 are of equal length and the inwardly inclined hooks 6 are circumferentially spaced a predetermined distance from each other. The ends of said inwardly inclined hooks are sharpened as at 7.

The baiting means D consists of the series of hooks 8, in this instance, there being three of said hooks equally spaced circumferentially of the staff C, with their barbed ends 9 extending outwardly therefrom and being fastened to said staff as at 10.

The base A is preferably provided of lead which is poured while hot, into a suitable forming die (not shown) of desirable shape, into which the looped end $c$ of the interconnecting means E has been set, with the loops or bends $e$ fitting therein and with the inwardly inclined hooks 6 properly spaced circumferentially. When the lead has cooled the interconnecting means E is solidly embedded in the center thereof, thus greatly adding to the strength of the wires 5 and their hooks 6, and thereby providing a more substantial and efficient crustacea hook. The upper end of the staff C is provided with the eye 11 into which the line or ordinary cord to be used is fastened.

The various parts just described are assembled with the connecting means E embedded in the center of the lead or other material that is fused and then formed as shown, with the staff C projecting perpendicular therefrom; the baiting means D being above the base A such a distance that when a crustacean partakes of the bait on the hooks 8, two or more of the inwardly inclined hooks 6 will be directly below the underside of its body. In partaking of said bait the crustacean must necessarily come into contact with a part of the hook, and the person having hold of the line or cord is instantly appraised of such fact, then, if the cord be jerked quickly said crustacean is securely speared by the sharp end 7, of one or more of the hooks 6 and the more the attempt to crawl or wriggle backward the deeper the inclined hooks 6 will penetrate into its body.

In practice the invention is ideal for use from breakwaters, boats or piers, and it may be used with success in the kelp-beds or in other growths of vegetation, in the form of so called marine gardens or otherwise, it merely being necessary that a very strong line or cord be used with which to haul the same to the surface of the water.

The invention may be used for capturing fresh water craw-fish, by constructing the hook considerably smaller than the size used for lobsters or other salt water crustacea.

When the invention is thrown or cast out quite a distance from the user, it is found that it is impossible to place my improved hook on its sides, that is, no matter how far it be cast, it has the advantage of always being in a perpendicular position, ready for use.

I do not desire to be understood as limiting myself to the specific provision, formation, construction, organization, combination and relative arrangement of parts, members and features as herein shown and described, but reserve the right to vary the same within the scope of the invention and in accordance with the terms of the following claims in the further utilization of the invention.

Having thus fully described my invention, what I claim as new therein, and desire to secure by Letters Patent, is:—

1. A crustacea hook comprising a staff; baiting means on the staff; and hooking means having loops fitting within a loop at the end of said staff; both of said loops being embedded in the base, substantially as described.

2. A crustacea hook comprising a base; hooking means comprising a plurality of wires extending circumferentially of said base; a staff extending perpendicularly of said base; baiting means on said staff; inclined hooks at the ends of said wires; and means for connecting the staff and said plurality of wires within the base; said base being so formed and of sufficient weight to keep the hooks and the staff in an upright operative position.

3. A crustacea hook comprising a base; a staff having a looped end embedded in said base and extending perpendicularly therefrom; a plurality of wires extending radially of said base and having sharpened inclined hooks at their ends, said wires having loops fitting within the loop of said staff; and baiting means on said staff, substantially as described.

4. A crustacea hook having a base; hooking means comprising a plurality of wires extending through and circumferentially of said base, and having centrally inclined sharpened hooks at the ends thereof; a staff extending from and perpendicular to said base; baiting means on said staff; and means for connecting the staff and said plurality of wires within the base, substantially as described.

In testimony whereof, I have signed my name to this specification in the presence of the two subscribing witnesses.

EMILE VACHÉ PARKER.

Witnesses:
W. F. SEEMANN,
PETER S. BAYER.

Copies of this patent may be obtained for five cents each, by addressing the "Commissioner of Patents, Washington, D. C."